Figure 1:
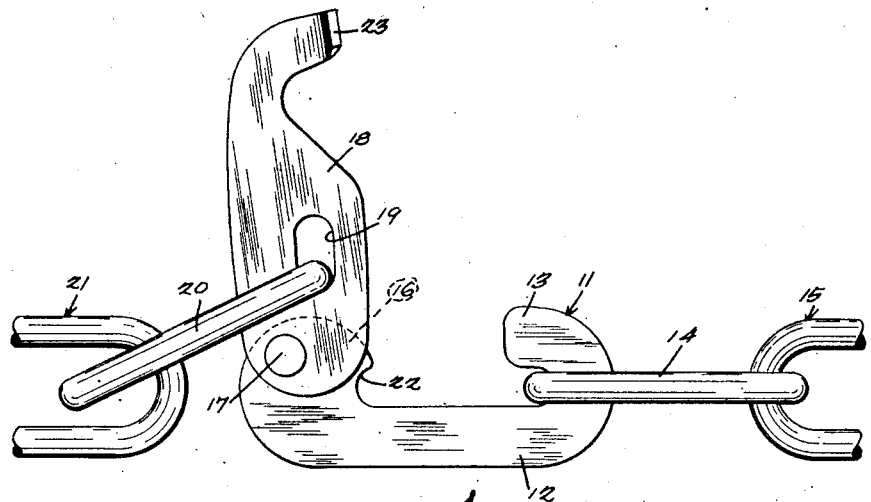

Aug. 14, 1928.

C. M. POWER 1,680,475

CHAIN FASTENER

Filed July 11, 1927   2 Sheets-Sheet 1

Charles M. Power
Inventor
by Smith and Freeman
Attorneys

Patented Aug. 14, 1928.

1,680,475

UNITED STATES PATENT OFFICE.

CHARLES M. POWER, OF KENT, OHIO, ASSIGNOR TO THE CLEVELAND CHAIN AND MANUFACTURING COMPANY, OF CLEVELAND, OHIO, A CORPORATION OF OHIO.

CHAIN FASTENER.

Application filed July 11, 1927. Serial No. 204,765.

Figure 2:
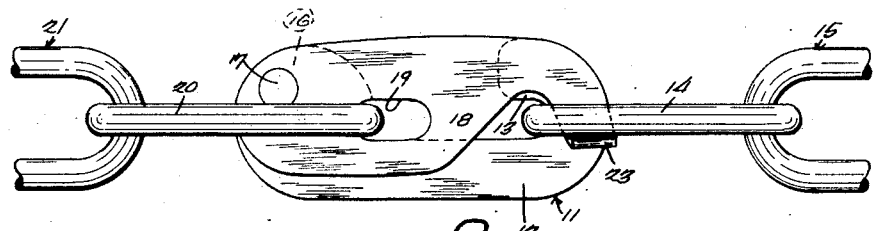
Figure 3:
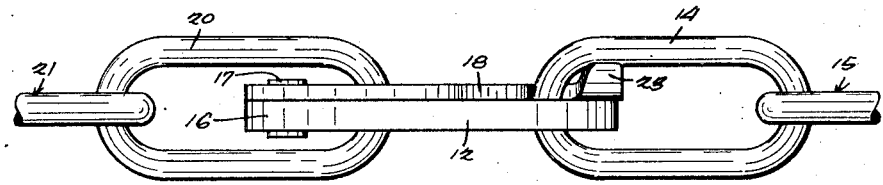
Figure 4:
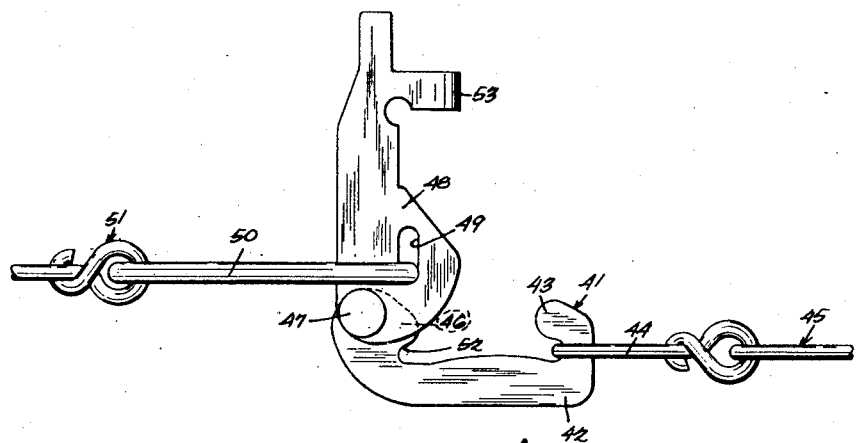
Figure 5:
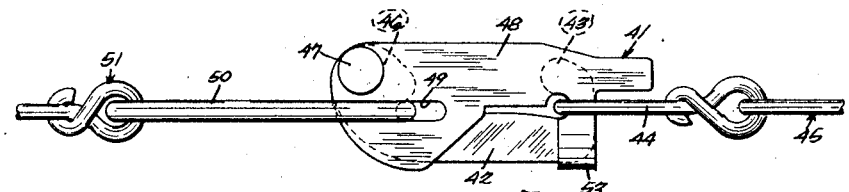
Figure 6:
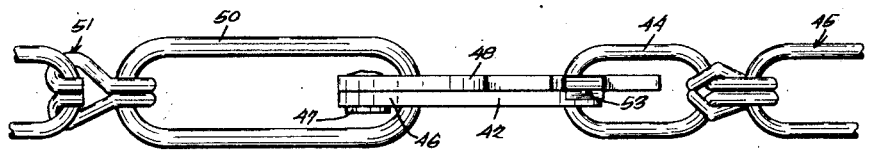

My invention relates to chain fasteners, particularly to chain fasteners for connecting a chain of the automobile anti-skid chain type, and the principal object of my invention is to provide a new and improved fastener particularly adapted for this purpose. In the drawings accompanying this specification and forming a part of this application I have shown, for purposes of illustration, two forms which my invention may assume, and in these drawings:

Figure 1 is a side elevation showing one form of my invention, and showing this form with the fastener open, Figure 2 is a similar view showing the fastener closed, Figure 3 is a bottom plan view of the fastener in the closed position, while Figures 4 through 6 are views similar to Figures 1 through 3 showing a second form which my invention may assume.

The fastener 11 shown in Figures 1 through 3 comprises a base 12 provided at its one end with a hook 13 adapted to receive and retain the link 14 of the chain 15, and at its other end with an upstanding extension 16 carrying a pivot 17 pivotally supporting a keeper 18 adapted to be swung into position closing the opening in the base 12 between the upstanding extension 16 and the hook 13 to hold the link 14 in position engaged upon the hook 13.

The keeper 18 is also provided with a slot 19 for the reception of the link 20 of the chain 21 positioned so that when the keeper 18 is moved into closed position the extension 16 of the base 12 engages the link 20 and removes from the keeper 18 the strain imposed upon the fastener 11 by the chains 15 and 21. For this purpose the extension 16 is slightly undercut, as shown at 22, but this undercutting is by no means sufficient to cause the chain link 20 to lock the keeper 18 in closed position, and I therefore provide means to accomplish that purpose, this means being shown in the embodiment of my invention disclosed in Figures 1 through 3 as a lip 23 formed at the free end of the keeper 18 in position to underlie the link 14 when the keeper 18 is in closed position, to thereby cause the link 14 to automatically hold the keeper 18 in closed position until the lip 23 is disengaged from below the link 14 by predetermined manipulation of the link 14.

The fastener 41 shown in Figures 4 through 6 comprises a base 42 provided at its one end with a hook 43 adapted to receive and retain the link 44 of the chain 45, and at its other end with an upstanding extension 46 carrying a pivot 47 pivotally supporting a keeper 48 adapted to be swung into position closing the opening in the base 42 between the upstanding extension 46 and the hook 43 to hold the link 44 in position engaged upon the hook 43.

The keeper 48 is also provided with a slot 49 for the reception of the link 50 of the chain 51, positioned so that when the keeper 48 is moved into closed position the extension 46 of the base 42 engages the link 50 and removes from the keeper 48 the strain imposed upon the fastener 41 by the chains 45 and 51. For this purpose the extension 46 is slightly undercut, as shown at 52, but this undercutting is by no means sufficient to cause the chain link 50 to lock the keeper 48 in closed position, and I therefore provide means to accomplish that purpose, this means being shown in the embodiment of my invention disclosed in Figures 4 through 6 as a lip 53 formed at the free end of the keeper 48 in position to underlie the base 42 when the keeper 48 is in closed position, thereby to automatically hold the keeper 48 in closed position until the lip 53 is disengaged from below the base 42 by predetermined springing of the keeper 48.

From the above description it will be obvious to those skilled in the art that I have provided a new and improved chain fastener particularly adapted for use with chains of the type of automobile anti-skid chains, and accordingly that I have accomplished at least the principal object of my invention. At the same time it also will be apparent to those skilled in the art that the particular embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. A chain fastener, for connecting a chain, such as an automobile anti-skid chain, comprising: a base, provided at one end with a recurrent hook forming a recess adapted to receive the chain to attach the chain to said base, said recess having that side thereof formed by the recurrent end of said hook extending substantially parallel to the direction of the strain normally imposed on said base by the chain, and a keeper, for holding said chain on said hook, pivoted to the other end of said base, provided with a projecting lip adapted to releasably hold said keeper in closed position, and provided also with a lug projecting, when said keeper is in closed position, into position to prevent the chain passing beyond said substantially parallel side of said recess.

2. A chain fastener, for connecting a chain, such as an automobile anti-skid chain, comprising: a base, provided at one end with a recurrent hook forming a recess adapted to receive the chain to attach the chain to said base, said recess having that side thereof formed by the recurrent end of said hook extending substantially parallel to the direction of the strain normally imposed on said base by the chain; and a keeper, for holding said chain on said hook, pivoted to the other end of said base, provided at its part lying adjacent said hook when said keeper is in closed chain-holding position with a projecting lip adapted to releasably hold said keeper in closed position, and provided intermediately with a lug projecting, when said keeper is in closed position, into position to prevent the chain passing beyond said substantially parallel side of said recess.

In testimony whereof I hereunto affix my signature.

CHARLES M. POWER.